United States Patent
Greunke et al.

(10) Patent No.: US 11,062,523 B2
(45) Date of Patent: Jul. 13, 2021

(54) CREATION AUTHORING POINT TOOL UTILITY TO RECREATE EQUIPMENT

(71) Applicant: The United States of America, as represented by the Secretary of the Navy, Arlington, VA (US)

(72) Inventors: Larry Clay Greunke, Seaside, CA (US); Mark Bilinski, Vista, CA (US); Christopher James Angelopoulos, Navarre, FL (US); Michael Joseph Guerrero, Seaside, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/929,572

(22) Filed: Jul. 15, 2020

(65) Prior Publication Data

US 2021/0019947 A1 Jan. 21, 2021

Related U.S. Application Data

(60) Provisional application No. 62/874,397, filed on Jul. 15, 2019.

(51) Int. Cl.
*G06T 19/00* (2011.01)
*G09B 19/00* (2006.01)
*G06T 17/00* (2006.01)

(52) U.S. Cl.
CPC ........... *G06T 19/006* (2013.01); *G06T 17/00* (2013.01); *G09B 19/003* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2002/0118229 A1* | 8/2002 | Batori | G06F 30/17 715/771 |
| 2016/0147408 A1* | 5/2016 | Bevis | G02B 27/017 715/850 |

(Continued)

OTHER PUBLICATIONS

Documentation for Placenote 1.6.12, https://docs.placenote.com/v/master/, released Mar. 5, 2019.

(Continued)

*Primary Examiner* — Frank S Chen
(74) *Attorney, Agent, or Firm* — Naval Postgraduate School; Scott Bell

(57) ABSTRACT

The invention relates to creating actual object data for mixed reality applications. In some embodiments, the invention includes using a mixed reality controller to (1) define a coordinate system frame of reference for a target object, the coordinate system frame of reference including an initial point of the target object and at least one directional axis that are specified by a user of the mixed reality controller, (2) define additional points of the target object, and (3) define interface elements of the target object. A 3D model of the target object is generated based on the coordinate system frame of reference, the additional points, and the interface elements. After receiving input metadata for defining interface characteristics for the interface elements displayed on the 3D model, the input metadata is sued to generate a workflow for operating the target object in a mixed reality environment.

18 Claims, 5 Drawing Sheets

(56) References Cited

U.S. PATENT DOCUMENTS

2018/0218538 A1* 8/2018 Short .................. G06F 3/011
2019/0197599 A1* 6/2019 Zia .................... G06T 19/006
2020/0035122 A1* 1/2020 Abbott ................ G06T 15/10

OTHER PUBLICATIONS

Brooks, What's Real About Virtual Reality?, IEEE Computer Graphics and Applications (vol. 19, Issue: 6, Nov.-Dec. 1999).

Reed et al., U.S. Army Mobile Augmented and Virtual Reality Training Systems for Handheld IED Detectors, I3M: The 14th International Multidisciplinary Modelling & Simulation Multiconference, Sep. 20, 2017.

* cited by examiner

# CREATION AUTHORING POINT TOOL UTILITY TO RECREATE EQUIPMENT

CROSS-REFERENCE TO RELATED APPLICATIONS

This application claims the benefit of U.S. Provisional Application No. 62/874,397, filed Jul. 15, 2019, which is hereby incorporated in its entirety by reference.

BACKGROUND OF THE INVENTION

1. Field of the Invention

The present invention relates generally to methods and systems for using a virtual reality system to recreate equipment in a mixed reality environment.

2. Description of the Related Art

Typically, virtual objects are replicated in mixed reality environments using specifications of the physical objects. Creating mixed reality experiences from computer-aided design (CAD) data, supplied by manufacturers, of physical objects may be correct but is not guaranteed. For example, equipment can be upgraded or modified so that CAD models are no longer accurate. Further, it can be expensive to obtain access to the CAD models in the first place. Another option is to reverse engineer the object; however, reverse engineering can also be quite costly. There are vast amounts of preexisting equipment where no 3D model exists to utilize and poses a barrier for mixed reality implementation. Further, in the cases where CAD models do exist, the models are often not immediately viable for a mixed reality experience—first requiring clean up, decimation, texturing, or other work.

Having cost prohibitive, suspect, or missing models have forced content developers to create mixed reality experiences with workflows relying on tool chains geared towards reverse engineering. Some workflows model via 3D scanning equipment creating point clouds where surfaces can be derived through algorithms; however, this is laborious and requires further contextual manipulation to be usable. Other workflows capture discrete points with a portable coordinate measuring machine.

Technologies have developed in augmented reality to create annotations in 3D space. For example, Placenote allows users to walk around, touch their screen, and make annotations at that physical position. However, Placenote notes position to an arbitrary coordinate system (i.e. where the application starts would be the origin and notes where the car handle would be from there) or world position through GPS. Accordingly, Placenote requires that the location of physical objects do not change in the actual world.

SUMMARY OF THE INVENTION

Embodiments in accordance with the invention relate to a method and system for creating actual object data for mixed reality applications. In some embodiments, the method includes using a mixed reality controller to (1) define a coordinate system frame of reference for a target object, the coordinate system frame of reference including an initial point of the target object and at least one directional axis that are specified by a user of the mixed reality controller, (2) define additional points of the target object, and (3) define interface elements of the target object. A 3D model of the target object is generated based on the coordinate system frame of reference, the additional points, and the interface elements. After receiving input metadata for defining interface characteristics for the interface elements displayed on the 3D model, the input metadata is used to generate a workflow for operating the target object in a mixed reality environment.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a creation authoring point tool utility.

Viable mixed reality experiences, where the matching digital domain can be spatially and contextually overlaid within the real world, require known precise positional and dimensional information about objects in the physical environment. Acquiring the digitization of physical objects attributes (e.g., height, width, length) is the first challenge. Context should also be added to these models so that the user can be guided within the mixed reality environment. Once a 3D model exists, in any form, content producers adapt them (e.g., decimate, add context) to provide a key element within mixed reality experiences. These digitized objects along with their context enable operations like step by step instructions for fixing/maintenance of an item or detailing physical object placement within a space. Embodiments described herein relate to a process for drastically expediting viable content creation while simplifying and augmenting authoring experiences. Further, the embodiments have the added benefit of reducing reliance on original equipment manufacturers (OEMs) for this data.

Implementations of the invention allow the user to rapidly define 3D objects in virtual reality, which can then be used to create mixed reality experiences. Specifically, the implementations define positions within a coordinate system that is defined in reference to the 3D object. This allows users to have mixed reality experiences that include the 3D object no matter where the 3D object is located in a physical environment.

Figure 1A:
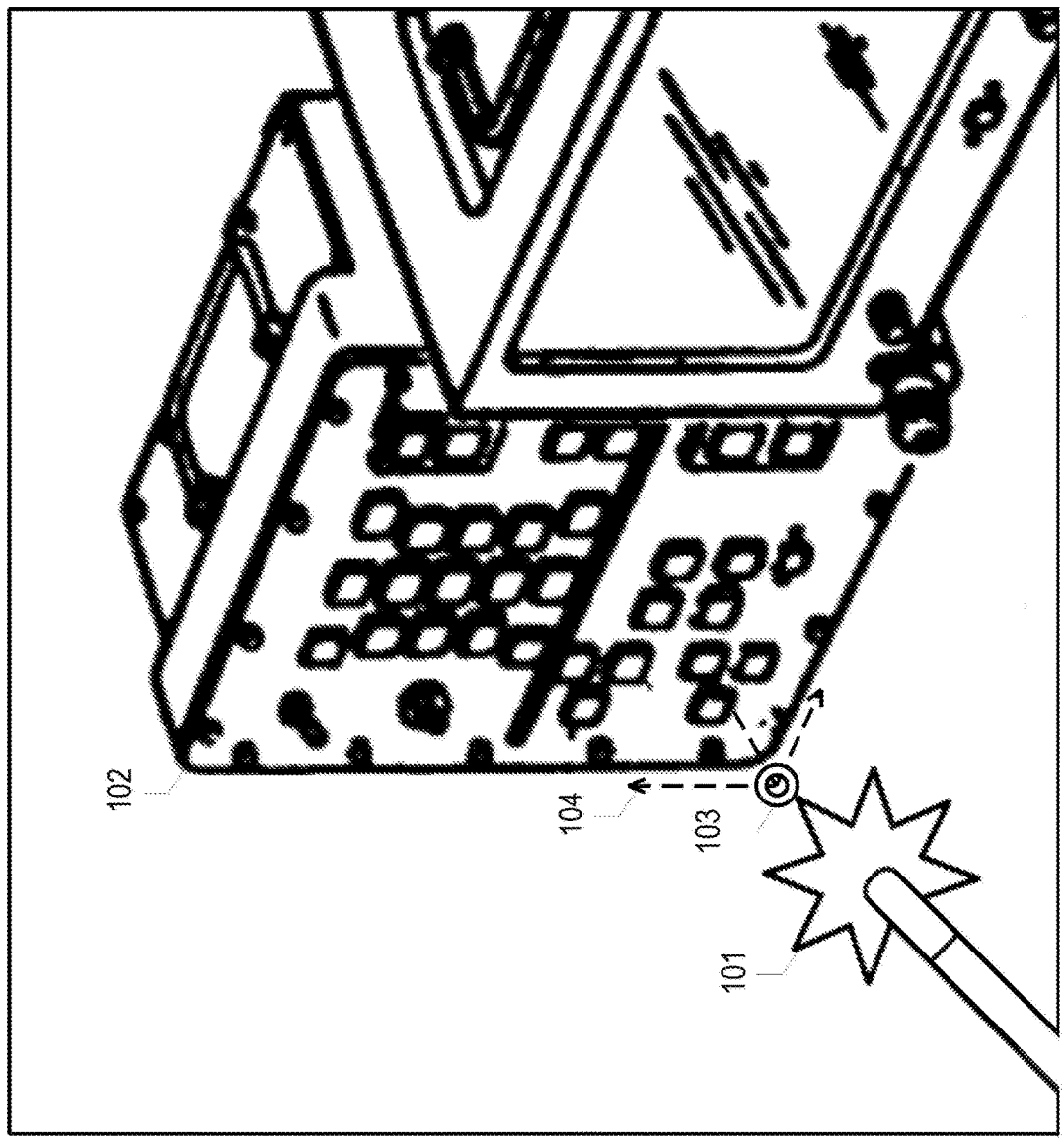
FIGS. 1A-1C illustrate positional data collection for a creation authoring point tool utility.
Figure 1B:
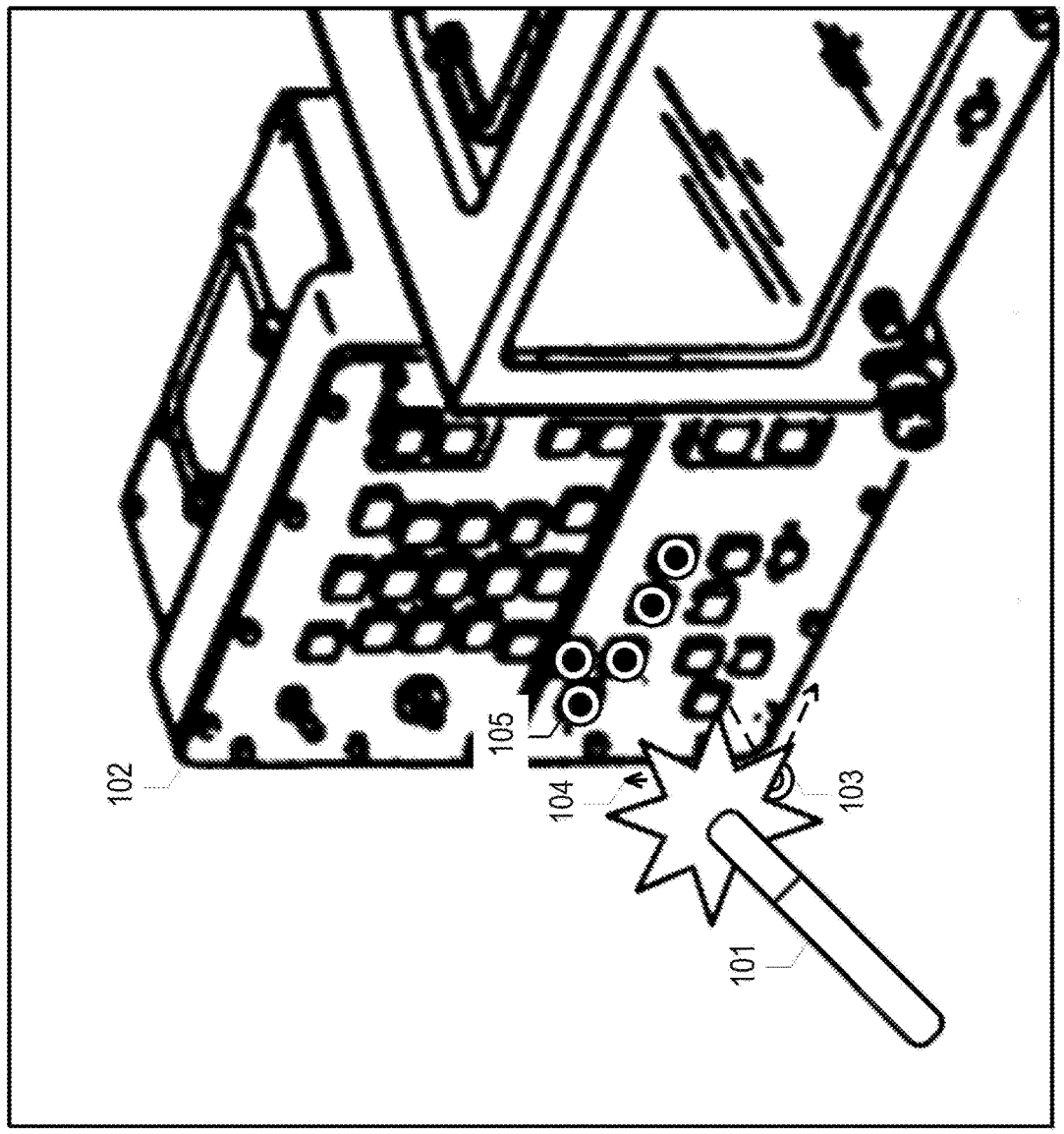
Figure 1C:
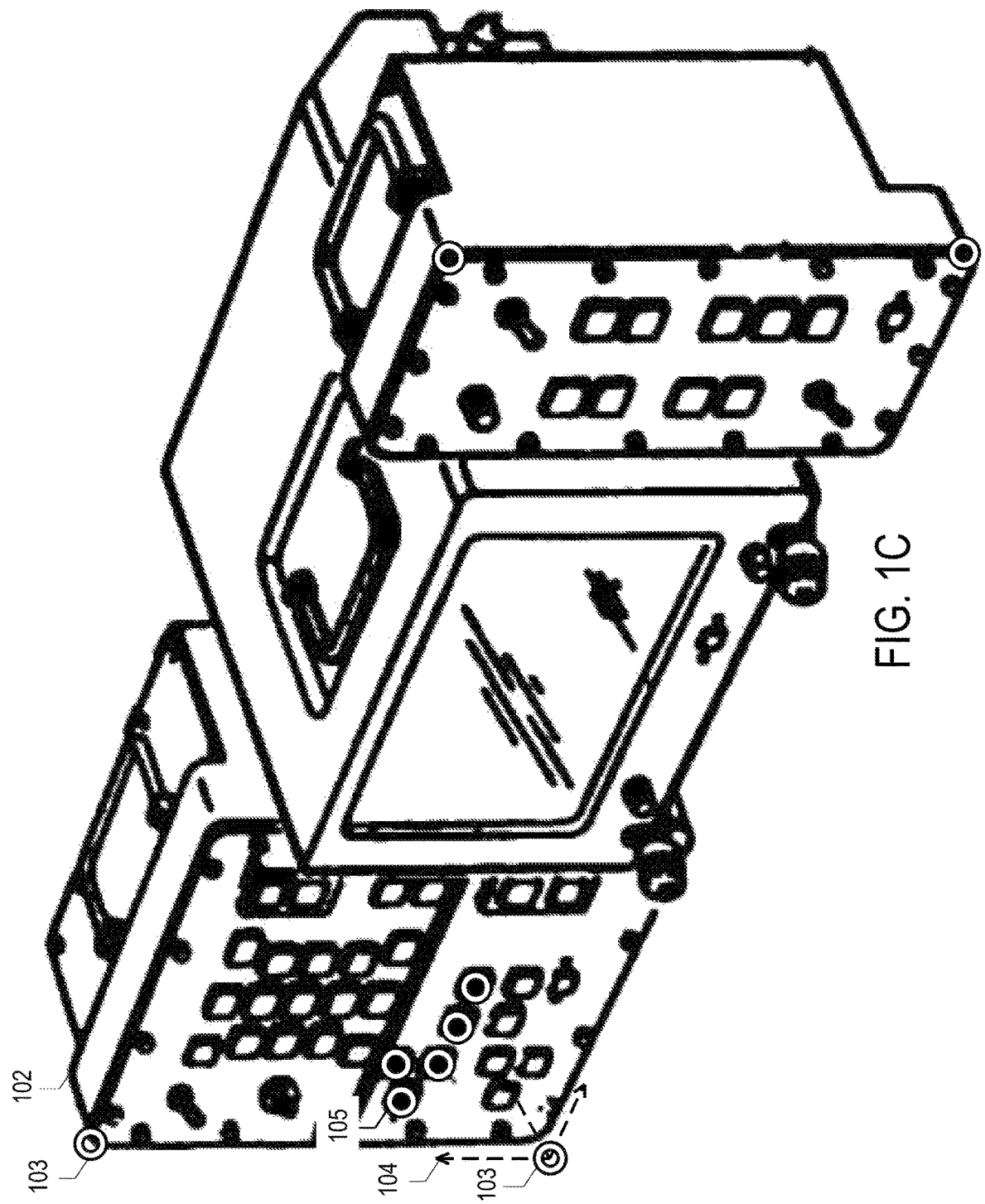

FIGS. 1A-1C illustrate a procedure for collecting positional data for a creation authoring point tool utility. Specifically, each of FIGS. 1A-1C shows the data collection at different stages as it is being used to generate a 3D model of a physical object for use within a mixed reality environment. Various embodiments may not include all the steps described below, may include additional steps, and may sequence the steps differently. Accordingly, the specific arrangement of steps described with respect to FIGS. 1A-1C should not be construed as limiting the scope of the creation authoring point tool utility.

FIG. 1A shows a mixed reality controller 101 that is being wielded by a user (not shown) to define a coordinate system frame of reference 103, 104 for a physical object 102. The mixed reality controller 101 is being used to position the coordinate system frame of reference 103, 104 on a corner of the physical object 102. The coordinate system frame of reference 103, 104 includes an initial object point 103 and three-dimensional directional axes 104. After the mixed reality controller 102 is used to position the initial object point 103, the direction of the three dimensional directional axes 104 can be modified to be in sync with the geometry of the physical object (e.g., aligned with the corner of a box-like physical object 102. The coordinate system frame of reference 103, 104 may be used as a reference point for any additional points specified by the mixed reality controller 101.

FIG. 1B shows the mixed reality controller 101 being used to define an interface element 105 in the mixed reality environment. Specifically, the user uses the mixed reality controller 101 to position the interface element 105 over a corresponding physical interface of the physical object 102. In this example, the user has defined five interface elements 105 that correspond to physical buttons on the physical object 102. Those skilled in the art will appreciate that the mixed reality controller 101 could be used to define any number of interface elements of various interface types (e.g., buttons, levers, switches, dials, etc.). As each interface element 105 is defined, its position is determined with respect to the coordinate system frame of reference 103, 104.

FIG. 1C shows point data specified by the user for a physical object 102. The point data for the physical object 102 includes four object points 103, one of which is a part of the coordinate system frame of reference 103, 104, and five interface elements 105. Once submitted by the user, the point data can be processed to generate a 3D model (not shown) of the physical object 102. The 3D model can then be used to collect metadata and generate a workflow as described below.

Figure 2:
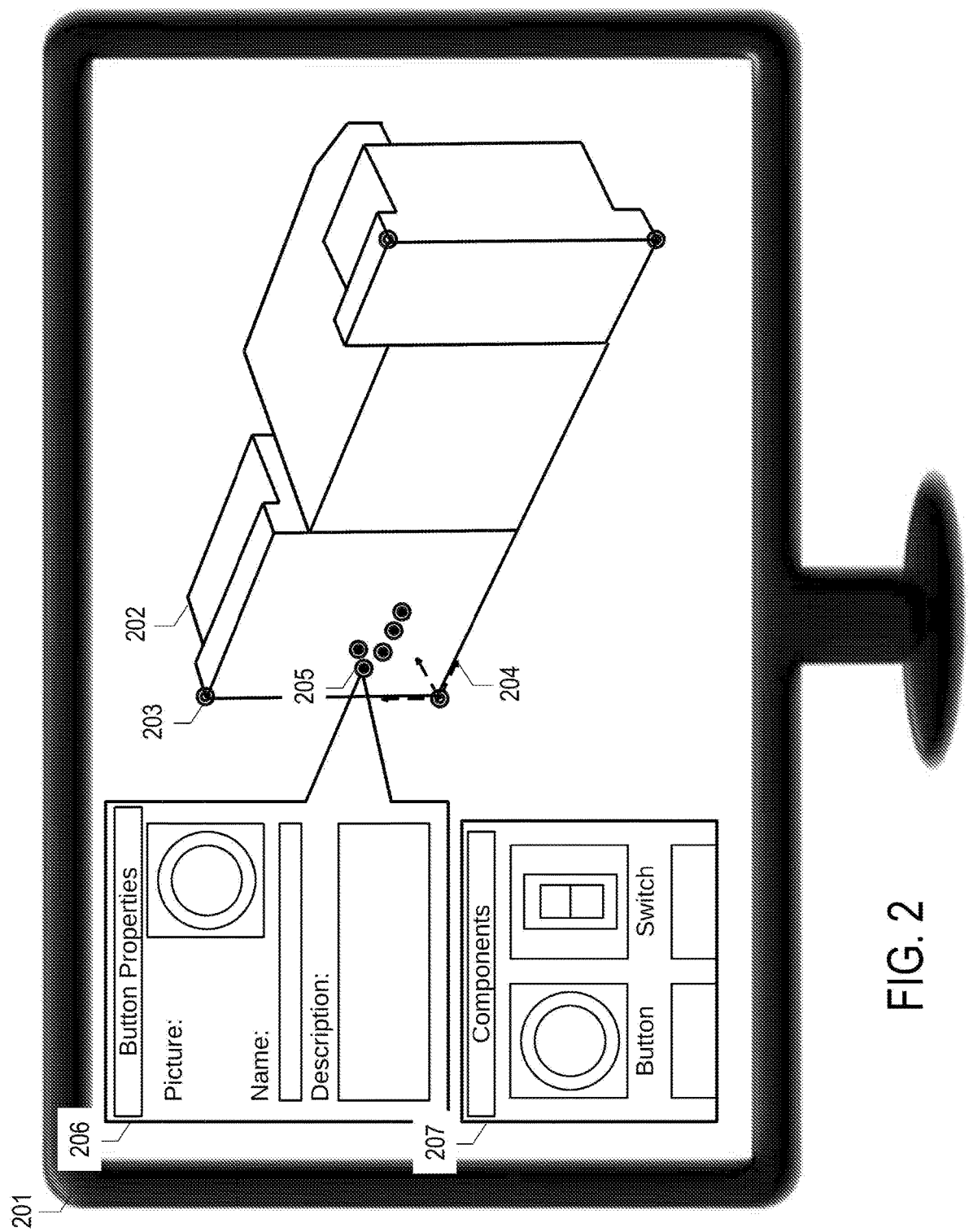
FIG. 2 shows an editor for collecting metadata for a creation authoring point tool utility.

FIG. 2 illustrates an editor 201 for collecting metadata for a creation authoring point tool utility. The editor 201 shows a 3D model 202 of a physical object that includes positional data 203, 204, 205 collected, for example, as described above with respect to FIGS. 1A-1C. The editor 201 allows a user to review the positional data for accuracy and to specify metadata for individual positional points in the 3D model 202.

When the user selects an interface element 205, an interface properties window 206 is displayed. The interface properties window 206 allows the user to specify metadata such as a picture, a name, a description, workflow information, etc. In this manner, the user may select each interface element 205 and specify the corresponding metadata in the interface properties window 206. In some cases, the metadata allows the interface element 205 to be used in workflows that describe how to operate the physical object in a mixed reality environment.

The editor 201 also includes a component type window 207 that allows the user to select the type of each interface element 205. In the example, the user can drag a component type from the window 207 and drop the selected type to a corresponding interface element 205 to set the interface type of the element 205.

The editor 201 can also allow the user to reposition object points 203, three dimensional directional axes 204, and interface elements 205. In this example, the user can reposition the positional data 203, 204, 205 by simply dragging it to a different location. The editor 201 can also allow the user to define workflows with the interface metadata.

In FIG. 2, the editor 201 is implemented as a standard user interface of a user computing device (e.g., laptop computer, desktop computer, tablet computer, etc.). In other embodiments, the editor could be implemented as a virtual interface of a virtual reality computing device. In these other embodiments, the user can interact with the 3D model 202 in a virtual environment interface that is similar to the editor 201.

Figure 3:
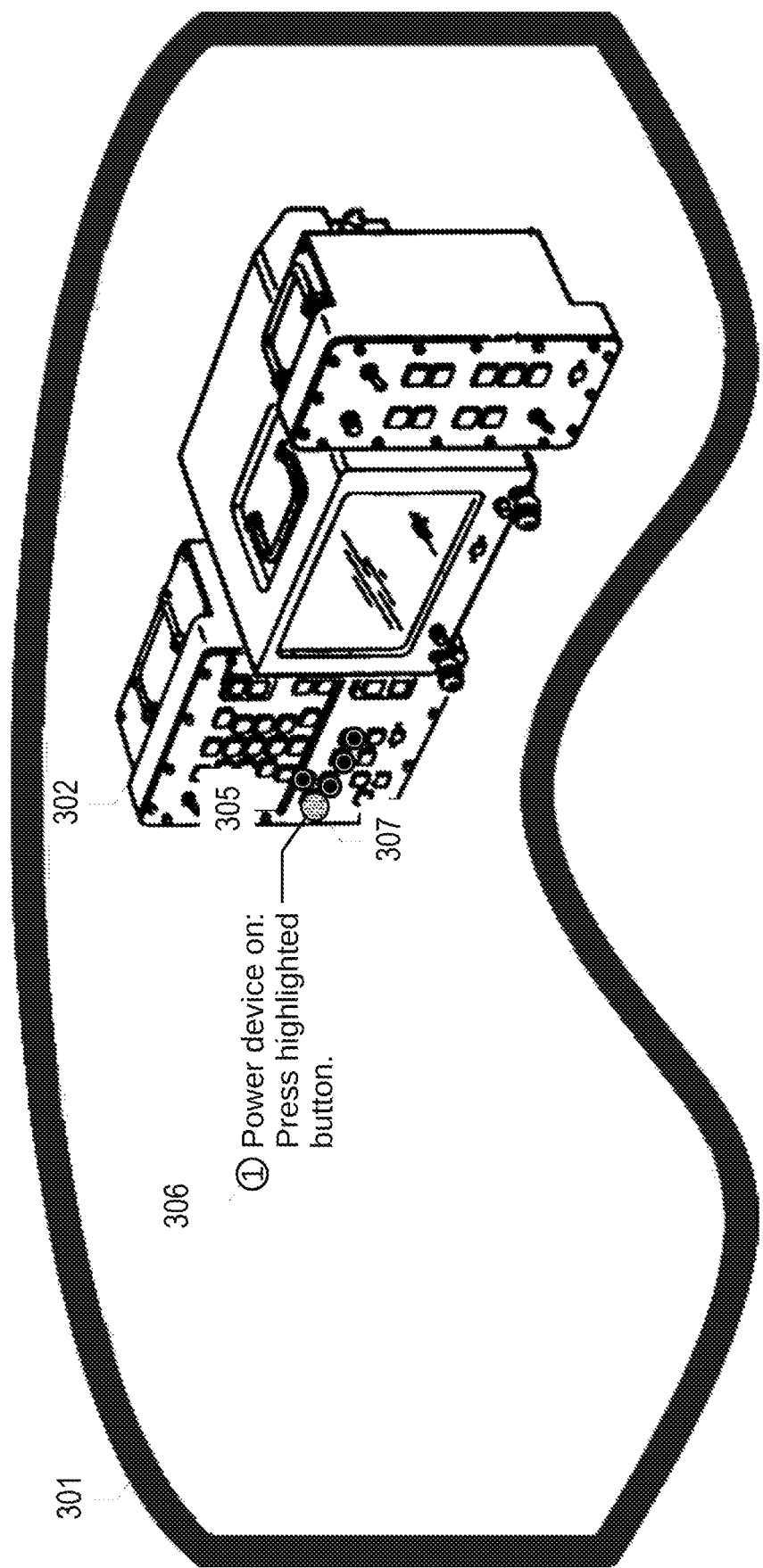
FIG. 3 shows a mixed reality environment as view through a virtual reality headset display 301.

FIG. 3 shows a mixed reality environment as view through a virtual reality headset display 301. In the display 301, the actual physical object 302 is overlaid with virtual representation of interface elements 305, workflow information 306, and a highlighted element 307. In a mixed reality environment, the overlaid virtual representation follows the physical object 302 as the user changes his view. The workflow information 306 can described an operation that the user should perform using the highlighted element 307.

The user can also use a mixed reality controller (not shown) to navigate through a wizard of the workflow. When the user completes a step of the workflow, he can use the controller to proceed to the next step in the workflow, where the workflow information 306 and highlighted element 307 are updated to provide instructions for the next interface element used in the next step. In this manner, the user can perform each step in the workflow until the workflow is completed. Because the 3D model of the physical object 302 is defined in reference to coordinate system frame of reference that is tied to a position on the physical object 302, the use can be guided through the workflow regardless of the actual location of the physical object 302 (i.e., the workflow guide still operates if the location of the physical object 302 is changed).

The invention may be implemented on virtually any type of computer regardless of the platform being used. For example, a computer system can include a processor, associated memory, a storage device, and numerous other elements and functionalities typical of today's computers. The computer may also include input means, such as mixed reality controllers or a keyboard and a mouse, and output means, such as a display or monitor. The computer system may be connected to a local area network (LAN) or a wide area network (e.g., the Internet) via a network interface connection. Those skilled in the art will appreciate that these input and output means may take other forms.

Further, those skilled in the art will appreciate that one or more elements of the computer system may be located at a remote location and connected to the other elements over a network. Further, the invention may be implemented on a distributed system having several nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method for creating actual object data for mixed reality applications, the method comprising:
    using a mixed reality controller to define a coordinate system frame of reference for a target object, the coordinate system frame of reference including an initial point of the target object and at least one directional axis that are specified by a user of the mixed reality controller;
    using the mixed reality controller to define additional points of the target object;
    using the mixed reality controller to define interface elements of the target object;
    generating a 3D model of the target object based on the coordinate system frame of reference, the additional points, and the interface elements;
    receiving input metadata for defining interface characteristics for the interface elements displayed on the 3D model; and
    using the input metadata to generate a workflow for operating the target object in a mixed reality environment.

2. The method of claim 1, further comprising using the interface characteristics to guide the user through the workflow in the mixed reality environment.

3. The method of claim 2, wherein guiding the user through the workflow further comprising presenting a workflow step for a current interface element, wherein the workflow step highlights the current interface element in the mixed reality environment.

4. The method of claim 1, wherein the input metadata comprises an interface type that is selected by the user from a group consisting of at least a button type, a switch type, and a dial type.

5. The method of claim 1, wherein the input metadata includes relative positioning data that specifies relative positions of the interface elements with respect to the initial point.

6. The method of claim 1, wherein input metadata is received from the mixed reality controller as specified by the user in the mixed reality environment.

7. A non-transitory computer-readable medium comprising executable instructions for causing a computer system to create actual object data for mixed reality applications, the instructions when executed causing the computer system to:
    use a mixed reality controller to define a coordinate system frame of reference for a target object, the coordinate system frame of reference including an initial point of the target object and at least one directional axis that are specified by a user of the mixed reality controller;
    use the mixed reality controller to define additional points of the target object;
    use the mixed reality controller to define interface elements of the target object;
    generate a 3D model of the target object based on the coordinate system frame of reference, the additional points, and the interface elements;
    receive input metadata for defining interface characteristics for the interface elements displayed on the 3D model; and
    use the input metadata to generate a workflow for operating the target object in a mixed reality environment.

8. The computer-readable medium of claim 7, wherein the instructions further cause the computer system to use the interface characteristics to guide the user through the workflow in the mixed reality environment.

9. The computer-readable medium of claim 8, wherein guiding the user through the workflow further comprising presenting a workflow step for a current interface element, wherein the workflow step highlights the current interface element in the mixed reality environment.

10. The computer-readable medium of claim 7, wherein the input metadata comprises an interface type that is selected by the user from a group consisting of at least a button type, a switch type, and a dial type.

11. The computer-readable medium of claim 7, wherein the input metadata includes relative positioning data that specifies relative positions of the interface elements with respect to the initial point.

12. The computer-readable medium of claim 7, wherein input metadata is received from the mixed reality controller as specified by the user in the mixed reality environment.

13. A mixed reality system comprising:
    a mixed reality controller to:
        define a coordinate system frame of reference for a target object, the coordinate system frame of reference including an initial point of the target object and at least one directional axis that are specified by a user of the mixed reality controller;
        define additional points of the target object; and
        define interface elements of the target object, and
    a computer system to:
        generate a 3D model of the target object based on the coordinate system frame of reference, the additional points, and the interface elements;
        receive input metadata for defining interface characteristics for the interface elements displayed on the 3D model; and
        use the input metadata to generate a workflow for operating the target object in a mixed reality environment.

14. The mixed reality system of claim 13, further comprising a mixed reality display to use the interface characteristics to guide the user through the workflow in the mixed reality environment.

15. The mixed reality system of claim 14, wherein guiding the user through the workflow further comprising presenting a workflow step for a current interface element, wherein the workflow step highlights the current interface element in the mixed reality environment.

16. The mixed reality system of claim 13, wherein the input metadata comprises an interface type that is selected by the user from a group consisting of at least a button type, a switch type, and a dial type.

17. The mixed reality system of claim 13, wherein the input metadata includes relative positioning data that specifies relative positions of the interface elements with respect to the initial point.

18. The mixed reality system of claim 13, wherein input metadata is received from the mixed reality controller as specified by the user in the mixed reality environment.

* * * * *